Feb. 12, 1963 A. MACOVSKI 3,077,550
HIGH VOLTAGE POWER SUPPLY REGULATION
Filed Jan. 28, 1953 2 Sheets-Sheet 1

INVENTOR.
Albert Macovski
BY W. H. [signature]
ATTORNEY

Feb. 12, 1963 A. MACOVSKI 3,077,550

HIGH VOLTAGE POWER SUPPLY REGULATION

Filed Jan. 28, 1953 2 Sheets-Sheet 2

INVENTOR.
Albert Macovski

BY W. H. Spouagle
ATTORNEY 3,077,550

HIGH VOLTAGE POWER SUPPLY REGULATION

Albert Macovski, Massapequa, N.Y., assignor to Radio Corporation of America, a corporation of Delaware Filed Jan. 28, 1953, Ser. No. 333,767
24 Claims. (Cl. 315—22)

Figure 1:
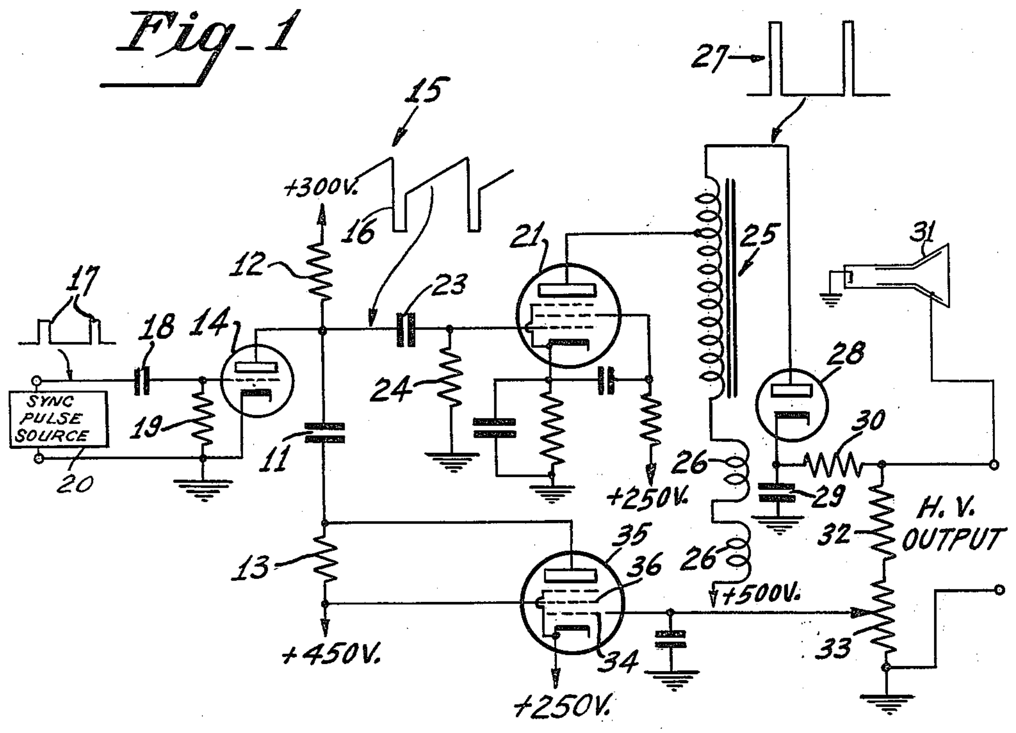

This invention relates to power supply regulator systems and particularly to the regulation of high voltage power supply systems of the flyback type employed in television receivers.

The high voltage necessary for the operation of kinescopes employed for image reproducing purposes in television receivers usually is produced by the rectification of the high voltage pulses produced during flyback or retrace in the horizontal deflection circuits. Inasmuch as this high voltage is employed to energize the final anode of an image reproducing kinescope, a fluctuation of this voltage tends to produce a number of adverse effects such as a change in the size of the picture, a change in the brightness, a change in the beam focus, a possible change in the deflection linearity and so forth. Fluctuations in the high voltage power supply are particularly objectionable in the operation of a color kinescope such as one of the type described in a paper titled "A Three-Gun Shadow-Mask Color Kinescope," by H. B. Law, published in the Proceedings of the I.R.E., vol. 39, No. 10, October 1951, at page 1186. Such a kinescope forms the subject matter of U.S. Patent No. 2,595,548, granted to A. C. Schroeder on May 6, 1952, and titled "Picture Reproducing Apparatus." In addition to some of the adverse effects noted with respect to black and white image reproducing kinescopes produced by fluctuations of the high voltage power supply, such fluctuations produce incorrect or misregistered colors in color kinescopes such as ones of the type referred to. It, therefore, is desirable to provide an effective voltage regulation system which is as simple and as inexpensive as feasible to effect a voltage regulation of a flyback type of power supply which is operated from the horizontal deflection circuits.

It, therefore, is an object of the present invention to provide an improved automatic regulator for a high voltage flyback type of power supply system.

An object of the invention is to provide an improved flyback type power supply regulator which functions in a manner so as to place a minimum of additional load upon the horizontal deflection system and/or the high voltage rectifier system.

In accordance with this invention, there is provided a generator of a substantially sawtooth wave for use in controlling the operation of a deflection amplifier. The sawtooth wave includes a peak component in that portion thereof which effects the cut-off of space current conduction in the deflection amplifier tube. Also included in the voltage regulator system in accordance with the invention is a means responsive to fluctuations of the high voltage power supply and which is coupled to the sawtooth wave generator in such a manner as to effect a variation of the peak component of the sawtooth wave suitably to maintain the high voltage substantially constant.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

Figure 2:
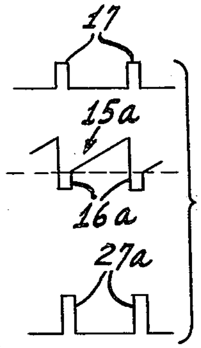
Figure 3:
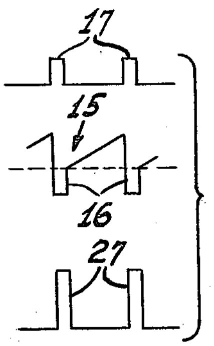
Figure 4:
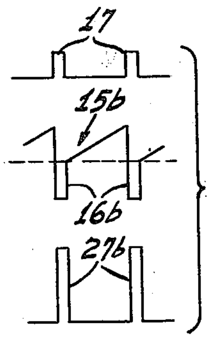
Figure 5:
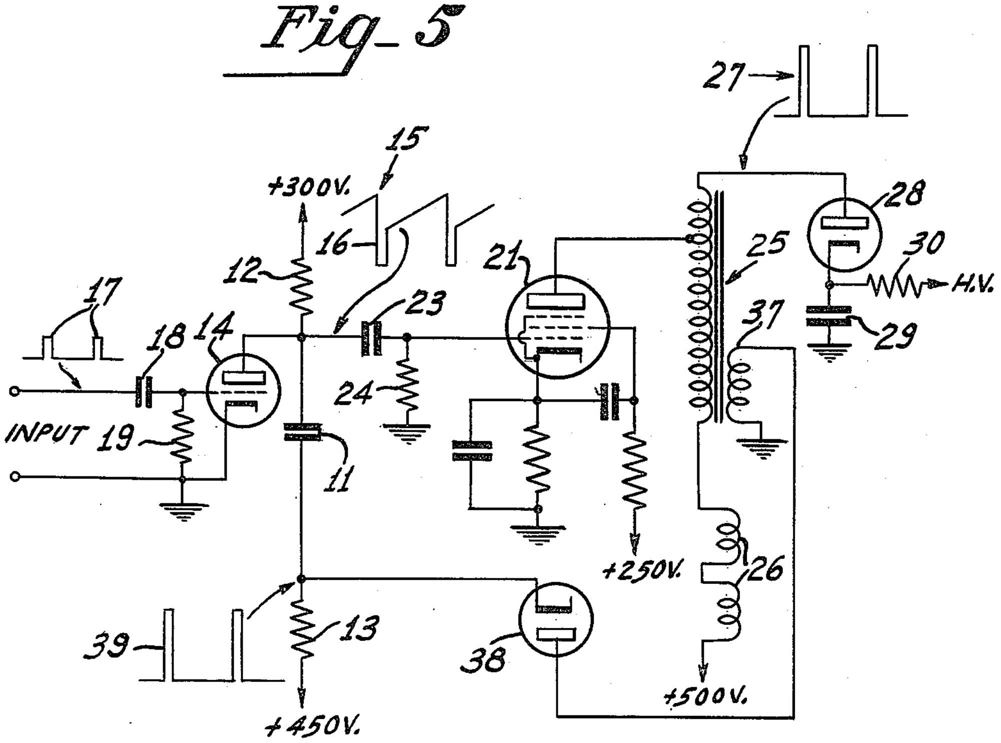

In the drawings:

FIGURE 1 is a circuit diagram of a high voltage regulator embodying the invention shown in conjunction with that portion of the horizontal deflection circuit to which it is related;

FIGURES 2, 3 and 4 respectively represent waveforms, under different operating conditions, of the voltages appearing in certain parts of the circuit of FIGURE 1 and which will be referred to for explanatory purposes in describing the operation of the invention as embodied in FIGURE 1; and, FIGURE 5 is a circuit diagram of another embodiment of the invention.

Referring now to FIGURE 1, there is shown a sawtooth wave generator including a capacitor 11 connected in series with a relatively high charging resistor 12 and a relatively low peaking resistor 13 across a power supply substantially as indicated. The sawtooth wave generator also includes a discharge electron tube 14 which is connected so as to effectively short circuit the charging resistor 12 and to provide a comparatively low impedance discharge path for the capacitor 11 in which the peaking resistor 13 provides a substantial portion of the discharge path impedance.

The sawtooth wave generator operates in a substantially conventional and well known manner so as to charge the capacitor 11 at a relatively slow rate and to discharge it at a relatively rapid rate, thereby producing a substantially sawtooth wave 15 at the anode of the discharge tube 14 substantially as indicated. Also, in a well known manner this substantially sawtooth wave 15 includes a peak component 16 which is produced by means including the peaking resistor 13. In effect the anode voltage of the discharge 14 is reduced to the minimum voltage of the power supply during conductive periods of the discharge tube. However, because of the presence of the peaking resistor 13 in the discharge circuit of the capacitor 11 and also by virtue of the relatively large value of the capacitor, it is not completely discharged during a conductive period of the tube 14. Accordingly, when current conduction in this tube is cut off, the anode voltage substantially instantaneously rises to the voltage at which the capacitor 11 remains charged. This voltage then is increased by the charging of the capacitor during the next cycle at the relatively slow rate.

The alternate conductive and non-conductive operation of the discharge tube 14 is controlled by sync pulses 17 derived from a sync pulse source 20 and occurring at line or horizontal deflection frequency. These sync pulses are impressed by means of a coupling capacitor 18 and a grid resistor 19 upon the space current control electrodes of the discharge tube 14. It will be understood that this tube is biased so as to be normally non-conducting and is rendered conducting only in response to the sync pulses 17. Therefore, it is seen that the peak components 16 of the substantially sawtooth wave 15 occur substantially simultaneously with the horizontal sync pulses 17.

The horizontal deflection circuit also includes an output or amplifier tube 21, the conduction and non-conduction of which is controlled by the substantially sawtooth wave 15 which is impressed upon the control grid by means of a coupling capacitor 23 and a grid resistor 24. The anode or output circuit of the deflection amplifier tube 21 includes an output transformer 25 which is connected to the horizontal windings 26 of an electron beam deflection yoke.

The current conduction by the deflection amplifier tube 21 is increased at a relatively slow rate under the control of the rising slopes of the substantially sawtooth wave 15 so as to effect a similar current variation in the yoke windings 26 in order to produce the desired deflection of an electron beam during the visible or trace portions of a deflection cycle. Also, under the control of the falling slopes of the sawtooth wave 15, current conduction in the deflection amplifier tube 21 is interrupted in an abrupt manner so as to cut off the supply of deflection current to the yoke windings 26 in order to effect a return deflection of the electron beam during the retrace portions of the deflection cycle. The cut off of space current in the tube 21 is increased in effectiveness by means of the peak component 16 of the substantially sawtooth control wave 15.

The sudden interruptions of the current supplied by the deflection amplifier tube 21 to the output transformer and to the horizontal deflection windings 26 produce high voltage pulses 27 in the plate circuit of the amplifier tube. These pulses are commonly called "flyback" pulses and are transformed in amplitude from corresponding pulses produced at the anode of the tube 21 by means of the autotransformer action of the output transformer 25. The flyback pulses 27 are rectified by a diode rectifier 28 in the output circuit of which is a smoothing filter comprising components such as a capacitor 29 and a resistor 30. The high voltage so produced is impressed upon a high voltage output circuit as indicated and which may include such apparatus as the final anode of an image reproducing kinescope 31, which may, for example, be a color kinescope of a type substantially as described in the aforementioned Law article.

This high voltage, however, is subject to a tendency to fluctuate depending upon variations in the load to which the high voltage output circuit is subjected. In the operation of an image reproducing kinescope, the high voltage fluctuations may be produced by changes in the picture content, for example. The voltage regulator, in accordance with the present invention, includes a bleeder circuit comprising a fixed resistor 32 and a potentiometer 33 connected in series across the high voltage output terminals. The movable contact of the potentiometer 33 is connected to the control grid 34 of a voltage regulator control electron tube 35. The screen grid 36 of this tube and the anode thereof are connected respectively to the terminals of the peaking resistor 13 in the sawtooth wave generator apparatus. The control tube 35, therefore, serves as a means for varying the effective peaking resistance in the discharge circuit of the sawtooth wave generator capacitor 11.

The operation of the described apparatus in effecting voltage regulation may better be understood by having additional reference to FIGURES 2, 3 and 4, showing respectively typical operating conditions. FIGURE 3 illustrates normal operation under an average load condition. FIGURE 2 illustrates operation of the system under a no load condition. FIGURE 4 represents operation of the apparatus under a condition of full load.

Assume that the load connected to the high voltage output circuit is materially descreased, for example, to a substantially no load condition. The voltage across this circuit tends to increase thereby increasing the voltage impressed upon the control grid 34 of the regulator tube 35 relative to its cathode. The impedance of this tube between the screen grid 36 and the anode consequently is reduced. Accordingly, during discharge periods of the sawtooth wave generator capacitor 11, the charge thereon is decreased below the normal point because of the decrease in the effective peaking resistance. Accordingly, when the discharge tube 14 is rendered non-conducting, the voltage remaining upon the capacitor 11 is substantially less than under normal operating conditions with the result that the amplitude of the peak component 16*a* of the wave 15*a* as shown in FIGURE 2 is less than the normal peak component amplitude 16 as shown in FIGURE 3. The impression of the sawtooth wave 15*a* upon the control grid of the deflection amplifier tube 21 therefore, does not effect as abrupt an interruption of the current supplied by this tube to the deflection circuit, including the transformer 25 and the horizontal yoke windings 26, as under normal operating conditions. Consequently, the high voltage pulses 27*a* of FIGURE 2 which are induced by the interruption of space current in the tube 21 are of somewhat lower amplitude than the normal high voltage pulses 27 of FIGURE 3. The subsequent rectification of the pulses 27*a* results in the production of a lower voltage for impression upon the high voltage output circuit.

Should the load on the high voltage output circuit increase to full load proportions, there is a tendency for the high voltage to decrease, thereby increasing the impedance of the space discharge path of the control tube 35 in parallel with the peaking resistor 13. Consequently, the peak component of the sawtooth wave is increased in amplitude as indicated by the peak component 16*b* of FIGURE 4 because of the increase in the effective peaking resistance. The use of such a sawtooth wave 15*b* for the control of the amplifier tube 21 effects a sharper than normal interruption of the current supplied to the deflection circuit, thereby producing high voltage pulses 27*b* of greater than normal amplitude. The rectification of these high voltage pulses tends to increase the magnitude of the high voltage sufficiently to maintain the voltage impressed upon the output circuit substantially constant.

It may be seen from the foregoing description of an illustrative embodiment of the invention that effective regulation of a flyback type of high voltage supply is afforded by relatively simple and, therefore, comparatively inexpensive apparatus.

It will be appreciated that the principle underlying the present invention of effecting regulation of a flyback type of power supply by control of the peak component of a substantially sawtooth wave employed to drive a deflection amplifier tube may be accomplished by other means within the scope of the present invention. For example, the sawtooth wave generator may be provided with apparatus such as that employed heretofore to produce a substantially sawtooth wave having a peak component of fixed amplitude. The voltage regulation in accordance with this invention in such a case may be accomplished by producing a pulse which varies in amplitude inversely to fluctuations of the high voltage power supply. These pulses then may be combined with the peak component of the sawtooth wave so as to add or subtract therefrom. The result of such a combination is substantially the same as the result produced by the apparatus of FIGURE 1 as shown in FIGURES 2, 3 and 4.

FIGURE 5, to which reference now will be made, illustrates such an embodiment of the invention. The deflection output transformer is provided with an auxiliary winding 37 in which to develop pulses during retrace intervals of the deflection cycle. The pulse winding 37 is coupled by means including a diode 38 to the peaking resistor 13 so as to impress voltage control pulses 39 upon the sawtooth wave generating apparatus. The polarity of the control pulses 39 is such as to partially cancel the peak component 16 which, in this form of the invention, is of a fixed magnitude so far as the circuit constants of the sawtooth wave generating apparatus itself is concerned. Also, the minimum amplitude of the control pulses 39 under full load conditions should be somewhat greater than the voltage of the power supply to which the peaking resistor 13 is connected. For example, where this supply voltage is approximately 450 volts as indicated, the minimum amplitude of the control pulses 39 should be approximately 460 volts.

In operation of this embodiment of the invention shown in FIGURE 5, the amplitude of the control pulses 39, being a minimum for full load conditions, there is effected a minimum of cancellation of the peak component 16 of the sawtooth wave 15. Consequently, the flyback pulses 27 have a maximum amplitude, whereby to produce the desired high voltage under full load conditions. A decrease in the load on the high voltage circuit tends to increase the amplitude of the flyback pulses 27 and hence of the control pulses 39. It also may be seen that control pulses 39, having greater than said minimum amplitude, effect more than a minimum of cancellation of the sawtooth wave peak component 16. An increase of the peak cancellation produces lower amplitude peak components, whereby the high voltage is maintained relatively constant.

The nature of the invention having been set forth in the foregoing description of a number of illustrative embodiments thereof, the scope of the invention is set forth in the appended claims.

What is claimed is:

1. In a high voltage flyback power supply system in which alternate conduction and non-conduction of a deflection amplifier providing flyback pulses is controlled by a substantially sawtooth wave having a peaking pulse component in that portion effecting non-conductive control of said amplifier, a regulator for said high voltage supply comprising, a generator of said sawtooth wave including means for producing said peaking pulse component, and means responsive to fluctuations of said high voltage and coupled to said peaking pulse component producing means for effecting a variation of substantially only the peaking pulse component of said sawtooth wave so as to maintain said high voltage substantially constant.

2. In a high voltage flyback power supply system in which alternate conduction and non-conduction of a deflection amplifier providing flyback pulses is controlled by a substantially sawtooth wave, a regulator for said high voltage supply comprising, a generator of said sawtooth wave including means to produce a peaking pulse component in that portion of said wave effecting non-conduction of said amplifier, and means responsive to fluctuations of said high voltage and coupled to said peaking pulse component producing means for varying the amplitude of said peaking pulse component without concomitantly effecting any substantial variation in the amplitude of the remaining portion of said sawtooth wave.

3. In a high voltage flyback power supply system in which alternate conduction and non-conduction of a deflection amplifier providing flyback pulses is controlled by a substantially sawtooth wave, a regulator for said high voltage supply comprising, a sawtooth wave generator including a capacitor having connected thereto a relatively high resistance charging circuit and a relatively low resistance discharging circuit, said discharging circuit having such resistance relative to the value of said capacitor to prevent complete discharge of said capacitor, thereby to produce a peak component in that portion of said wave effecting non-conduction of said amplifier, and means responsive to fluctuations of said high voltage and coupled to said generator for varying the amplitude of substantially only the peak component of said sawtooth wave suitably to maintain said high voltage substantially constant, said amplitude varying means comprising means for varying the effective resistance of said discharging circuit.

4. In a high voltage flyback power supply system in which alternate conduction and non-conduction of a deflection amplifier providing flyback pulses is controlled by a substantially sawtooth wave, a regulator for said high voltage supply comprising, a sawtooth wave generator including a capacitor having connected thereto a charging resistor and a discharging resistor, said discharging resistor having such a value relative to the value of said capacitor to produce a peak component in that portion of said wave effecting non-conduction of said amplifier, and means responsive to fluctuations of said high voltage and coupled to said discharging resistor for varying the amplitude of substantially only the peak component of said sawtooth wave suitably to maintain said high voltage substantially constant, said amplitude varying means comprising means for varying the effectiveness of said discharging resistor.

5. In a high voltage flyback power supply system in which alternate conduction and non-conduction of a deflection amplifier providing flyback pulses is controlled by a substantially sawtooth wave having a peak component in that portion effecting non-conductive control of said amplifier, a regulator for said high voltage supply comprising, a sawtooth wave generator including a capacitor having connected thereto a relatively high charging resistor and a relatively low resistance discharging circuit, said discharging circuit including a resistor and at least a portion of the space discharge path of an electron tube, the value of said discharging circuit resistor being such relative to the value of said capacitor to prevent complete discharge of said capacitor, thereby to produce said sawtooth wave peak component, and means for varying the amplitude of substantially only the peak component of said sawtooth wave suitably to maintain said high voltage substantially constant, said amplitude varying means comprising means responsive to fluctuations of said high voltage and coupled to said tube for varying the impedance of said space discharge path.

6. A regulator for a high voltage flyback power supply system as defined in claim 5 wherein, said discharging circuit resistor is connected in parallel with at least a portion of said electron tube space discharge tube, said responsive means includes a bleeder resistor connected to said high voltage power supply, and an intermediate point on said bleeder resistor being connected to a space discharge control electrode of said tube.

7. A regulator for a high voltage flyback power supply system as defined in claim 6 wherein, said electron tube is a pentode having an anode and a screen grid connected respectively to the terminals of said discharging circuit resistor, said pentode also having a space discharge control grid connected to said bleeder resistor.

8. In a high voltage flyback power supply system in which alternate conduction and non-conduction of a deflection amplifier providing flyback pulses is controlled by a substantially sawtooth wave, a regulator for said high voltage supply comprising, a sawtooth wave generator including a capacitor having connected thereto a relatively high resistance charging circuit and a relatively low resistance discharging circuit, said discharging circuit having such resistance relative to the value of said capacitor to prevent complete discharge of said capacitor, thereby to produce a peak component in that portion of said wave effecting non-conduction of said amplifier, means responsive to fluctuations of said high voltage to develop control pulses varying in amplitude in accordance with said voltage fluctuations, and means impressing said control pulses upon said sawtooth wave generator in a manner to vary the amplitude of substantially only the peak component of said sawtooth wave suitably to maintain said high voltage substantially constant.

9. In a high voltage flyback power supply system in which alternate conduction and non-conduction of a deflection amplifier providing flyback pulses is controlled by a substantially sawtooth wave, a regulator for said high voltage supply comprising, a sawtooth wave generator including a capacitor having connected thereto a relatively high resistance charging circuit, and a relatively low resistance discharging circuit, said discharging circuit having such resistance relative to the value of said capacitor to prevent complete discharge of said capacitor, thereby to produce a peak component in that portion of said wave effecting non-conduction of said amplifier, means responsive to fluctuations of said high voltage to develop control pulses varying in amplitude in accordance with said voltage fluctuations, and means for varying the amplitude of substantially only the peak component of sawtooth wave suitably to maintain said high voltage substantially constant, said amplitude varying means comprising means for impressing said control pulses upon said sawtooth wave generator in a polarity opposite to that of said produced peak component.

10. In a high voltage flyback power supply system in which alternate conduction and non-conduction of a deflection amplifier providing flyback pulses is controlled by a substantially sawtooth wave, a regulator for said high voltage supply comprising, a sawtooth wave generator including a capacitor having connected thereto a relatively high resistance charging circuit and a relatively low resistance discharging circuit, said discharging circuit producing a peak component in that portion of said wave effecting non-conduction of said amplifier, means responsive to fluctuations of said high voltage to develop control pulses varying in amplitude in accordance with said voltage fluctuations, and means for varying the amplitude of substantially only the peak component of said sawtooth wave suitably to maintain said high voltage substantially constant, said last-named means comprising means impressing said control pulses upon the discharging circuit of said sawtooth wave generator in a polarity tending to cancel said peak component.

11. A voltage regulation system comprising, means supplying a substantially sawtooth wave to control electron beam deflection apparatus, said wave having a trace portion during which its amplitude changes in one polarity from an initial amplitude at a relatively slow rate and a retrace portion during which its amplitude changes in the opposite polarity at a relatively rapid rate and includes a peak component extending in said opposite polarity beyond said initial trace portion amplitude, a deflection amplifier having an input circuit coupled to said wave supplying means, and an output circuit coupled to said deflection apparatus and providing flyback pulses during retrace periods, a flyback type of high voltage power supply apparatus coupled to said deflection amplifier output circuit and producing a unidirectional voltage of a magnitude corresponding to the amplitude of said flyback pulses, said power supply apparatus having an output voltage supplying circuit, and means coupled between said output voltage supplying circuit and said wave supplying means to vary substantially only the peak component of said sawtooth wave in response to fluctuations of said high voltage supply suitably to vary the amplitude of said flyback pulses.

12. A voltage regulation system comprising, means supplying a substantially sawtooth wave to control electron beam deflection apparatus, said wave having a trace portion during which its amplitude changes in one polarity from an initial amplitude at a relatively slow rate and a retrace portion during which its amplitude changes in the opposite polarity at a relatively rapid rate and includes a peak component extending in said opposite polarity beyond said initial trace portion amplitude, a deflection amplifier having an input circuit coupled to said wave supplying means, and an output circuit including a transformer coupled to said deflection apparatus and providing flyback pulses in a winding of said transformer during retrace periods, a flyback type of high voltage power supply apparatus coupled to said transformer winding and producing a unidirectional voltage of a magnitude corresponding to the amplitude of said flyback pulses, an auxiliary winding on said transformer to develop control pulses, and means coupled between said auxiliary pulse winding and said wave supplying means to combine said control pulses with said sawtooth wave in a manner to vary substantially only the peak component of said sawtooth wave in response to fluctuations of said high voltage supply suitably to vary the amplitude of said flyback pulses.

13. In a voltage control circuit for a load whose operation requires the delivery of sweep drive signals thereto, the combination with said load of a generator providing a source of electrical energy for said sweep drive signals, means including a discharge tube and an R-C network responsive to operation of said generator to regulate the transmission of said sweep drive signals, a power supply-controlling switch tube having its plate circuit leading to said load to be energized, and also having its control grid responsive to the values prevailing in said R-C network, a voltage regulating tube having its plate circuit included within said R-C network, and its grid circuit distinct from that of said discharge tube, and means to vary the excitation voltage of said voltage regulating tube grid circuit in accordance with variations in the amount of power delivered to said load.

14. In a voltage control circuit for a load whose operation requires the delivery of sweep drive signals thereto, the combination with said load of means including an R-C network for regulating the delivery of said sweep drive signals to said load, a source of operating power for said load, means including a switch tube controlling delivery of said operating power to said load, and means for controlling the excitation voltage applied to said switch tube, said means including a voltage regulating tube having its grid-cathode circuit across said load and responsive solely thereto, and having its plate circuit included within said R-C network.

15. In a voltage controlling circuit, a generator providing a source of electrical energy, a discharge circuit including a discharge tube and an R-C network responsive to said generator for producing a sweep drive signal, a voltage regulating tube having its plate circuit directly connected with said R-C network, and its grid circuit distinct from said discharge circuit, a power supply-controlling switch tube having a plate circuit leading to a load to be energized, and also having a control grid responsive to the R-C characteristics of said network, means for storing energy in said R-C network between successive conducting periods of said discharge tube, and means for controlling the magnitude of the stored energy charge in accordance with the excitation voltage applied to said control grid.

16. In a voltage control circuit, a generator providing a source of electrical energy, a discharge circuit including an R-C network responsive to said generator for producing a sweep drive signal for control of a utilization device, a voltage regulating tube having its plate circuit directly connected with said R-C network, and means to vary the excitation voltage applied to said voltage regulating tube solely in accordance with variations in the amount of power delivered to said utilization device.

17. In a voltage control circuit, a source of a series of horizontal frequency pulses, a discharge circuit responsive to said series of pulses for producing a sweep drive signal, a charge resistance-capacitance network in said discharge circuit providing the charge portion of said sweep drive signal, a discharge resistance-capacitance network in said discharge circuit providing the discharge portion of said sweep drive signal, a switching circuit conductive in response to positive portions of said sweep drive signal comprising both the charge and discharge portion thereof and non-conducting during the negative portions of said sweep drive signal comprising both the charge and discharge portions thereof producing a retrace time during said non-conducting period, a power supply circuit providing a high voltage output voltage in response to rate of change of current flow from said switching circuit, a picture tube having the high voltage therefor supplied by said power supply circuit, an electron beam deflection circuit associated with said picture tube, a feedback circuit independent of said electron beam deflection circuit but connected to said power supply for providing a feedback voltage, and a voltage control tube connected to said discharge resistance-capacitance network and responsive to variations of feedback voltage for varying the effective resistance of said discharge resistance-capacitance network, thereby varying the amplitude and rate of change of the discharge portion of said sweep drive signal in order to regulate the output voltage of said power supply circuit.

18. In a voltage control circuit, a generator providing a source of electrical energy, a discharge circuit responsive to said generator for producing a sweep drive signal having a discharge portion, a power supply circuit comprising a high voltage transformer, a switching circuit responsive to said sweep drive signal for controlling the output voltage for said power supply circuit, and a voltage regulating circuit connected to said discharge circuit and responsive to variations of the output voltage of said transformer for varying substantially only the discharge portion of said sweep drive signal, thereby regulating the output voltage of said power supply circuit.

19. In a voltage control circuit, a generator providing a source of electrical energy, a discharge circuit responsive to said generator for producing a sweep drive signal having a discharge portion, a power supply circuit comprising a high voltage transformer, an energy deflection circuit adapted to be energized by way of said transformer, a switching circuit responsive to said sweep drive signal for controlling the output voltage for said power supply circuit, a feedback circuit connected to the output of said transformer, and a voltage control tube interconnecting said discharge circuit and said feedback circuit and responsive to variations of output voltage of said transformer for varying substantially only the discharge portion of said sweep drive signal, thereby providing voltage regulation for said power supply circuit.

20. In a voltage control circuit, a generator providing a source of electrical energy, a discharge circuit responsive to said generator for producing a sweep drive signal having a discharge portion thereof, a power supply circuit comprising primary and secondary transformer windings, a switching circuit responsive to said sweep drive signal for controlling the output voltage of one of said transformer windings, a voltage regulating circuit having a feedback circuit connected to the output of said power supply circuit for providing a feedback voltage, and a voltage control tube in said voltage regulating circuit connected to said discharge circuit and responsive to variations of feedback voltage for varying the amplitude of substantially only the discharge portion of said voltage control signal for regulating the output voltage of said power supply circuit.

21. In a voltage control circuit, a generator providing a source of electrical energy, a discharge circuit responsive to said generator for producing a sweep drive signal, a discharge resistance-capacitance network in said discharge circuit providing a discharge portion for said sweep drive signal, a power supply circuit comprising a high voltage transformer, an energy deflection circuit adapted to be energized by way of said transformer, a switching circuit responsive to said sweep drive signal for controlling the output voltage of said power supply circuit, a voltage regulating circuit having a feedback circuit independent of said energy deflection circuit, and a voltage control tube in said voltage regulating circuit connected to said discharge resistance-capacitance network and responsive to variations of feedback voltage for varying the effective resistance of said discharge resistance-capacitance network, thereby controlling the rate of change of the discharge portion of said voltage control signal for regulating the output voltage of said transformer.

22. In a voltage control circuit, a generator providing a source of electrical energy, a discharge circuit responsive to said generator for producing a sweep drive signal, a discharge resistance-capacitance network in said discharge circuit providing the discharge portion of said sweep drive signal, a power supply circuit comprising a high voltage transformer, a switching circuit responsive to said sweep drive signal and connected to said high voltage transformer for varying the rate of change of magnetic flux in said transformer for controlling the output voltage of said power supply circuit, a feedback circuit connected to said power supply circuit for providing a feedback voltage, and a voltage control tube connected to said discharge resistance-capacitance network and responsive to variations of feedback voltage for varying the effective resistance of said discharge resistance-capacitance network, thereby varying the amplitude and rate of change of the discharge portion of said sweep drive signal in order to vary the rate of change of magnetic flux in said transformer to provide voltage regulation.

23. In a voltage control circuit, a generator providing a source of electrical energy, a discharge circuit responsive to said generator for producing a sweep drive signal comprising a sawtooth signal having a negative pulse superimposed thereon, a power supply circuit comprising a high voltage transformer, a switching circuit responsive to said sweep drive signal for controlling the output voltage for said power supply circuit, and a voltage regulating circuit connected to said discharge circuit and responsive to variations of the output voltage of said power supply circuit for varying the negative pulse of said sweep drive signal, thereby regulating the output voltage of said power supply circuit.

24. In a voltage control circuit, a generator providing a source of electrical energy, a discharge circuit responsive to said generator for producing a sweep drive signal comprising a sawtooth waveform having a negative pulse superimposed thereon, a discharge resistance-capacitance network in said discharge circuit providing a discharge portion and negative pulse for said sweep drive signal, a power supply circuit comprising primary and secondary transformer windings, a switching circuit responsive to said sweep drive signal for controlling the output voltage of said power supply circuit, a voltage regulating circuit having a feedback circuit connected to the output of said power supply circuit, and a voltage control tube in said voltage regulating circuit connected to said discharge resistance-capacitance network and responsive to variations of feedback voltage for varying the amplitude of said negative pulse produced by said discharge resistance-capacitance network, thereby controlling the rate of change of the discharge portion of said voltage control signal for regulating the output voltage of said power supply circuit.

References Cited in the file of this patent

UNITED STATES PATENTS

| | | |
|---|---|---|
| 2,074,459 | Vance | Mar. 23, 1937 |
| 2,237,425 | Geiger et al. | Apr. 8, 1941 |
| 2,413,932 | Sziklai | Jan. 7, 1947 |
| 2,490,743 | Sziklai | Dec. 6, 1949 |
| 2,510,027 | Forsch | May 30, 1950 |
| 2,667,614 | Covill | Jan. 26, 1954 |
| 2,697,798 | Schlesinger | Dec. 21, 1954 |

FOREIGN PATENTS

| | | |
|---|---|---|
| 124,922 | Australia | July 17, 1947 |